United States Patent
Guo et al.

(10) Patent No.: US 9,578,040 B2
(45) Date of Patent: Feb. 21, 2017

(54) PACKET RECEIVING METHOD, DEEP PACKET INSPECTION DEVICE AND SYSTEM

(71) Applicant: Huawei Technologies Co., Ltd., Shenzhen (CN)

(72) Inventors: Jiancheng Guo, Shenzhen (CN); Zhenggang You, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 14/572,514

(22) Filed: Dec. 16, 2014

(65) Prior Publication Data

US 2015/0103688 A1  Apr. 16, 2015

Related U.S. Application Data (63) Continuation of application No. PCT/CN2012/077994, filed on Jun. 30, 2012.

(51) Int. Cl.
| | |
|---|---|
| *H04W 4/00* | (2009.01) |
| *H04L 29/06* | (2006.01) |
| *H04L 12/851* | (2013.01) |
| *H04L 12/26* | (2006.01) |

(52) U.S. Cl.
CPC ............. *H04L 63/123* (2013.01); *H04L 43/10* (2013.01); *H04L 47/2441* (2013.01); *H04L 63/0236* (2013.01); *H04L 63/0245* (2013.01)

(58) Field of Classification Search
CPC ........ H04L 29/06; H04L 12/26; H04L 63/123; H04L 43/10

USPC .................................................... 370/395.94
See application file for complete search history.

(56) References Cited

U.S. PATENT DOCUMENTS

| | | | |
|---|---|---|---|
| 6,108,330 A | * | 8/2000 | Bhatia ..................... H04L 12/24 370/352 |
| 6,256,671 B1 | | 7/2001 | Strentzsch et al. |
| 6,950,660 B1 | * | 9/2005 | Hsu ..................... H04L 12/2859 370/328 |
| 6,961,783 B1 | | 11/2005 | Cook et al. |
| 7,228,359 B1 | | 6/2007 | Monteiro |

(Continued)

FOREIGN PATENT DOCUMENTS

| | | |
|---|---|---|
| CN | 101068253 A | 11/2007 |
| CN | 101141396 A | 3/2008 |

(Continued)

*Primary Examiner* — Farah Faroul
(74) *Attorney, Agent, or Firm* — Leydig, Voit & Mayer, Ltd.

(57) ABSTRACT

Embodiments of the present invention provide a packet receiving method, a deep packet inspection device and system, which relates to the field of communications. The packet receiving method includes: receiving a service request packet sent by a terminal device, where the packet carries a terminal domain name indicating the terminal device and a server domain name indicating a service server required by the service request; resolving the received server domain name to obtain a service server Internet protocol (IP) address; and discarding the packet if the resolved service server IP address does not belong to the preset service server IP address corresponding to the received terminal domain name in a preset list. Embodiments of the present invention are applied to the processing of the packet.

11 Claims, 3 Drawing Sheets a DPI device receives a service request packet sent by a terminal device, where the packet carries a terminal domain name indicating the terminal device and a server domain name indicating a service server required by the service request sent by the terminal device — S101 the DPI device resolves the received server domain name to obtain a service server IP address — S102 if the service server IP address resolved by the DPI device does not belong to the preset service server IP address corresponding to the received terminal domain name in a preset list , the DPI device discards the packet — S103

(56) References Cited

U.S. PATENT DOCUMENTS

| | | | |
|---|---|---|---|
| 8,275,895 B1* | 9/2012 | Ellis | H04L 63/168 |
| | | | 709/227 |
| 2005/0259645 A1* | 11/2005 | Chen | H04L 29/12066 |
| | | | 370/389 |
| 2007/0079365 A1* | 4/2007 | Ito | H04L 63/20 |
| | | | 726/11 |
| 2007/0155384 A1* | 7/2007 | Haran | H04L 29/12066 |
| | | | 455/434 |
| 2007/0258449 A1 | 11/2007 | Bennett | |
| 2008/0086574 A1* | 4/2008 | Raciborski | H04L 29/12066 |
| | | | 709/245 |
| 2009/0049539 A1* | 2/2009 | Halbedel | H04L 63/0272 |
| | | | 726/14 |
| 2010/0132031 A1 | 5/2010 | Zheng | |
| 2010/0269174 A1* | 10/2010 | Shelest | H04L 29/12066 |
| | | | 726/22 |
| 2014/0289311 A1* | 9/2014 | Kubota | H04L 67/1036 |
| | | | 709/203 |
| 2014/0359041 A1* | 12/2014 | Bai | H04L 61/6013 |
| | | | 709/207 |
| 2015/0195243 A1* | 7/2015 | Roskind | H04L 61/1511 |
| | | | 709/213 |
| 2016/0278001 A1* | 9/2016 | Zhang | H04L 61/2015 |

FOREIGN PATENT DOCUMENTS

| | | |
|---|---|---|
| CN | 101945053 A | 1/2011 |
| CN | 102004789 A | 4/2011 |
| JP | 200277252 A | 3/2002 |
| JP | 2004180159 A | 6/2004 |
| JP | 2009272659 A | 11/2009 |
| JP | 201034901 A | 2/2010 |

* cited by examiner

PACKET RECEIVING METHOD, DEEP PACKET INSPECTION DEVICE AND SYSTEM

CROSS-REFERENCE TO RELATED APPLICATIONS

This application is a continuation of International Patent Application No. PCT/CN2012/077994, filed Jun. 30, 2012, which is hereby incorporated by reference in its entirety.

TECHNICAL FIELD

The present invention relates to the field of communications and, more particularly, to a packet receiving method, a deep packet inspection device and system.

BACKGROUND

Nowadays, Internet services become increasingly sophisticated, and types of the services are gradually increasing, a user terminal is able to access websites such as video websites and game websites, and such websites are either free or charged on operator's demands, and the user terminal can select to access on his own demands.

Generally, a service server used by a user to access a website corresponds to an IP (Internet Protocol, Internet protocol) address, the user can send a packet carrying a domain name and relevant information of the visiting website, generally, when a DPI (Deep Packet Inspection, deep packet inspection) device strategically matches the packet information, a full URL (Uniform Resource Location, uniform resource locater) information containing a host field needs to be used, which is different from the packet processing principle of the existing service server, thus bugs may occur in the DPI device detection, for example, the service server merely inspects path information in the URL of the packet, and does not inspect the host field, such that the service server can return access results according to the path information without determining whether the path information is consistent with the path provided by the host field, that is, without determining whether the user has altered the host field without authorization. As a result, the user can successfully access the charged service through altering the packet without authorization, but the DPI device fails to identify whether the user terminal has altered the host field in the packet to achieve a purpose of fraudulent accessing a charged website for free.

SUMMARY

Embodiments of the present invention provide a packet receiving method, a deep packet inspection device and system, which can improve the capability for identifying the packet of the deep packet inspection device, and prevent occurrence of bugs caused by insufficient identification.

To achieve the above object, embodiments of the present invention provide technical solutions as follows:

One aspect of the invention provides a packet receiving method, including:

receiving a service request packet sent by a terminal device, where the packet carries a terminal domain name indicating the terminal device and a server domain name indicating a service server required by the service request sent by the terminal device;

resolving the received server domain name to obtain a service server Internet protocol (IP) address; and discarding the packet if the resolved service server IP address does not belong to the preset service server IP address corresponding to the received terminal domain name in a preset list.

Another aspect of the invention provides a deep packet inspection (DPI) device, including:

a receiving unit, configured to receive a service request packet sent by a terminal device, where the packet carries a terminal domain name indicating the terminal device and a server domain name indicating a service server required by the service request sent by the terminal device;

a resolving unit, configured to resolve the server domain name received by the receiving unit to obtain a service server Internet protocol (IP) address; and a processing unit, configured to discard the packet if the service server IP address resolved by the resolving unit does not belong to the preset service server IP address corresponding to the received terminal domain name in a preset list.

Still another aspect of the invention provides a system, including:

a DPI device as described above; and a terminal device, configured to send a service request packet to the DPI device, where the packet carries a terminal domain name indicating the terminal device and a server domain name indicating a service server required by the service request sent by the terminal device.

According to the packet receiving method, the DPI device and the system provided by embodiments of the present invention, the DPI device receives a service request packet sent by a terminal device, where the packet carries a terminal domain name indicating the terminal device and a server domain name indicating a service server required by the service request, resolves the received server domain name to obtain a service server Internet protocol (IP) address, and discards the packet if the service server IP address does not belong to the preset service server IP address corresponding to the terminal domain name in a preset list. In this way, the DPI device can determine whether the packet is normal or abnormal by comparing the service server IP address of the packet with the preset service server IP address corresponding to the terminal domain name of the terminal device in a preset list to determine whether the service server IP address of the packet is consistent with the preset service server IP address, and discard the abnormal packet, thereby improving the capability for identifying the packet of the DPI device, and preventing the bugs from occurring when the DPI device normally processes the abnormal packet due to insufficient identification.

BRIEF DESCRIPTION OF DRAWINGS

To illustrate the technical solution according to embodiments of the present invention or the prior art more clearly, the following briefly describes the accompanying drawings used in description of embodiments of the present invention or the prior art. Apparently, the accompanying drawings below are merely for illustrating some embodiments of the present invention, and other drawings can be obtained by persons skilled in the art based on these drawings without creative efforts.

DESCRIPTION OF EMBODIMENTS

The technical solutions of the embodiments of the present invention are hereinafter described clearly and completely with reference to the accompanying drawings in embodiments of the present invention. Obviously, the embodiments described here are only a part of embodiments of the present invention, rather than all embodiments of the present invention. All other embodiments obtained by persons skilled in the art based on embodiments of the present invention without any creative efforts shall fall within the protection scope of the present invention.

Figure 1:
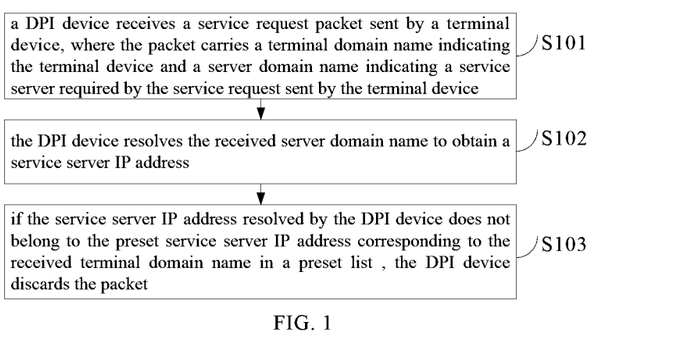
FIG. 1 is a schematic flow chart of a packet receiving method according to an embodiment of the present invention.

Embodiments of the present invention provide a packet receiving method, as shown in FIG. 1, the method includes:

S101, a DPI device receives a service request packet sent by a terminal device, where the packet carries a terminal domain name indicating the terminal device and a server domain name indicating a service server required by the service request sent by the terminal device.

It should be noted that, a suitable network in this embodiment may perform communication and connection on the basis of the TCP/IP (Transmission Control Protocol/Internet Protocol, transmission control protocol/Internet protocol), in such a network, each of terminal devices and service servers connected to the network has a unique identifier, so as to distinguish tens of thousands of terminal devices and service servers in the network. Generally, such a unique identifier may be a character address, namely a domain name. Since each terminal device and each service server have a unique domain name of its own, the terminal device only needs to notify the DPI device of its own domain name as the terminal domain name when the terminal device requests services to the DPI device, the DPI device can find the terminal device by the terminal domain name, and forward or provide services required by the terminal device to the terminal device. Furthermore, the terminal device can implement the access to the service server required by the service request by writing the domain name of the service server, as the server domain name, into the packet.

Illustratively, the terminal device needs to access available resources on the network, such as a hypertext markup language document, an image, a video segment, and a program. Service servers supporting different websites can be identified by the server domain name which is taken as the unique identification ID. When the terminal device needs to access a website, the terminal device sends a URL packet, into which packet a server domain name of a service server corresponding to the website has been written. The server domain name is a character address of the service server corresponding to the website needs to be accessed by the terminal device. For example, when a user needs to access a website of A company by using the terminal device, the URL can be written as www.A.com or the like.

S102, the DPI device resolves the received server domain name to obtain a service server IP address.

Further, the DPI device performs a DNS (Domain Name Server, domain name service) resolution to the server domain name, such as resolving in a manner of local query, cache query and iterative query, so that the domain name which is readily memorized by a user, such as www.baidu.com and www.google.com, can be converted to a machine recognizable IP address such as 1.1.1.10 and 2.2.2.2, and the machine recognizable IP address is taken as the service server IP address. Thereby the DPI device can help the terminal device access the service server by using the service server IP address, and then the service server can provide services for the terminal device.

S103, if the service server IP address resolved by the DPI device does not belong to the preset service server IP address corresponding to the received terminal domain name in a preset list, the DPI device discards the packet.

It should be noted that, a preset list is preset in the DPI device in advance, as shown in Table 1, in the preset list the terminal domain name of each terminal device is correspondingly provided with accessible service server IP addresses under an access authority of the terminal device. The accessible service server IP addresses are taken as the preset service server IP addresses. One terminal device can correspond to a plurality of preset service server IP addresses.

TABLE 1

| Terminal domain name | Preset service server IP address |
| --- | --- |
|  | 1.1.1.1 |
| www.huawei.com | 2.2.2.20 |
| www.google.com | 2.2.2.2 |

Figure 2:
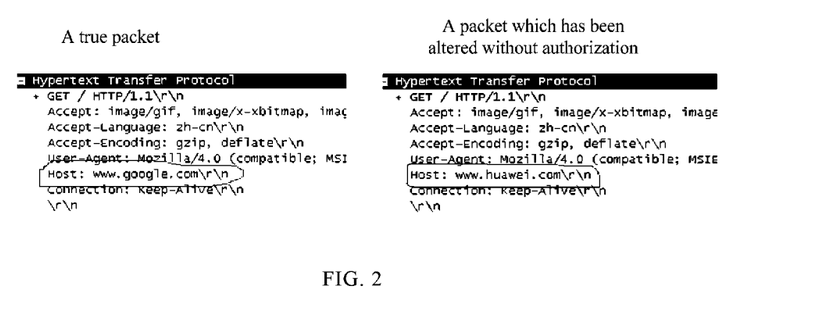
FIG. 2 is a comparison diagram between a true packet and a packet which has been altered without authorization according to an embodiment of the present invention.

Illustratively, as shown in Table 1, the terminal domain name of a terminal device A is www.huawei.com, and the terminal device A can only access two preset service servers of 1.1.1.1 and 2.2.2.20, provided that neither of the two preset service servers is charged; the terminal domain name of a terminal device B is www.google.com, the terminal device B can access to 2.2.2.2, and the preset service server corresponding to this IP address is charged. As shown in FIG. 2, provided that the IP address corresponding to www.huawei.com is 1.1.1.1 while the IP address corresponding to www.google.com is 2.2.2.2, that is, the terminal device A can only access the preset service server of www.huawei.com for free, but cannot access the preset service server of www.google.com. In the prior art, however, during processing of URL in the packet, the service server only focuses on a path after a GET request without inspecting a host field, and returns the access results according to the path after the GET request without judging whether the path information is consistent with the path provided by the host field; the service server only reads addresses after the host and then accesses without checking whether the fields after the host are the correct fields for a free accessible website. As a result, if the terminal device A changes the domain name after the host from www.google.com to www.huawei.com, then the terminal device A can access www.google.com for free, and the access result can be returned to the terminal device A by the www.huawei.com after the GET. In this way, the user can successfully access the charged service through altering the packet, but the DPI device fails to identify whether the user terminal has altered the host field in the packet to achieve a purpose of fraudulent accessing a charged website for free.

According to embodiments of the present invention, the DPI device sets the terminal domain name www.huawei.com of the terminal device A and the accessible service server thereof, which is taken as the preset service server, in a preset list; if the service server IP address corresponding to the server domain name obtained by resolving for the terminal device A does not belong to the preset service server IP address in Table 1 corresponding to the terminal domain name www.huawei.com, that is, corresponding to the terminal device A, for example, if the IP address obtained by resolving the server domain name is 2.2.2.2, neither 1.1.1.1 nor 2.2.2.20, then the packet is considered to be abnormal, and the abnormal packet is discarded so as to prevent the terminal device A from successfully accessing the charged service through altering the packet without authorization; if the IP address obtained by resolving the server domain name is 2.2.2.20, which is one of 1.1.1.1 and 2.2.2.20, then the packet is considered to be normal, and a connection between the terminal device A and the service server of which the IP address is 2.2.2.20 according to the service request requested by the packet, such that the service server provides the service corresponding to the service request to the terminal device A.

In the packet receiving method according to embodiments of the present invention, the DPI device receives a service request packet sent by a terminal device, where the packet carries a terminal domain name indicating the terminal device and a server domain name indicating a service server required by the service request, resolves the received server domain name to obtain a service server Internet protocol (IP) address, and discards the packet if the service server IP address does not belong to the preset service server IP address corresponding to the terminal domain name in a preset list. In this way, the DPI device can determine whether the packet is normal or abnormal by comparing the service server IP address of the packet with the preset service server IP address corresponding to the terminal domain name of the terminal device in a preset list to determine whether the service server IP address of the packet is consistent with the preset service server IP address, and discard the abnormal packet, thereby improving the capability for identifying the packet of the DPI device, and preventing the bugs from occurring when the DPI device normally processes the abnormal packet due to insufficient identification.

Figure 3:
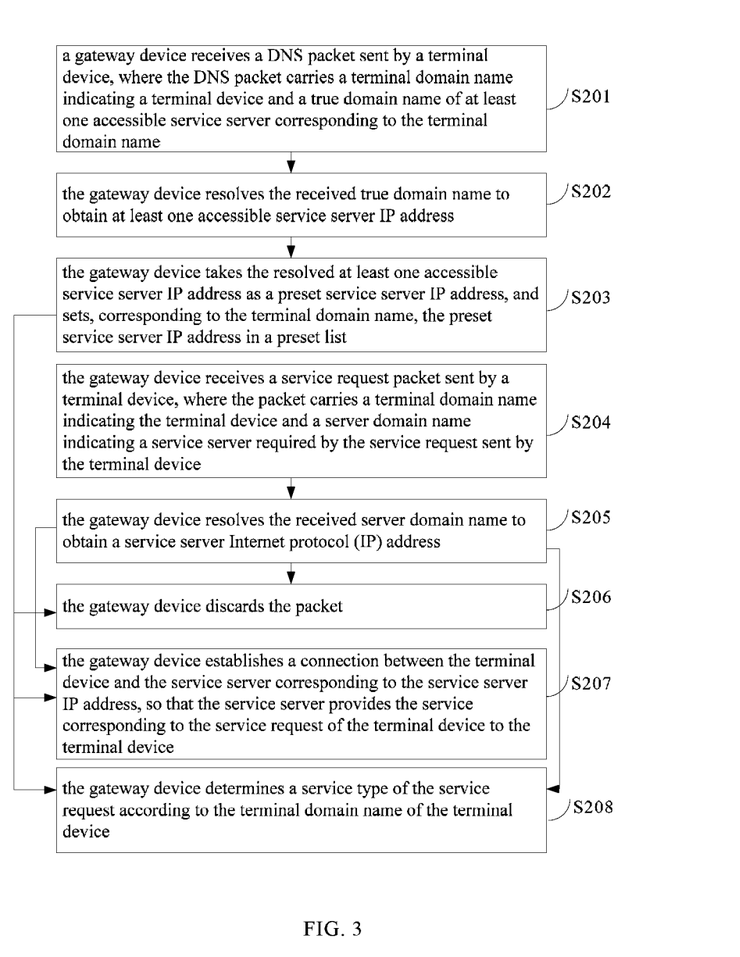
FIG. 3 is a schematic flow chart of a packet receiving method according to another embodiment of the present invention.

A packet receiving method according to another embodiment of the present invention is described by taking a gateway device having a DNS resolution function as an example, while other devices having the DNS resolution function shall also fall within the protection scope of the present invention. As shown in FIG. 3, the method may include:

S201, a gateway device receives a DNS packet sent by a terminal device, where the DNS packet carries a terminal domain name indicating a terminal device and a true domain name of at least one accessible service server corresponding to the terminal domain name.

It should be pointed out that, the gateway device may send a DNS query request to a terminal device during an idle time, so that each terminal device sends a DNS packet to the gateway device; Or when receiving a DNS packet of the terminal device without sending the query request, the gateway device may also obtain the terminal domain name indicating the terminal device and the true domain name of at least one accessible service server corresponding to the terminal domain name, which are carried in the DNS packet.

S202, the gateway device resolves the received true domain name to obtain at least one accessible service server IP address.

It should be noted that, the gateway device resolves the true domain name to obtain a server IP address which the terminal device is authorized to access, such as an IP address which can be accessed for free.

S203, the gateway device takes the resolved at least one accessible service server IP address as a preset service server IP address, and sets, corresponding relation between the terminal domain name and the preset service server IP address in a preset list.

Illustratively, the gateway device sets, corresponding relation between the terminal domain name HTTP/1.1\r\n, and the resolved accessible service server IP address of the terminal device A such as 2.2.2.20 and 1.1.1.1 in the preset list, where the accessible service server IP address is referred to as the preset service server IP address, and sets, corresponding relation between the terminal domain name HTTP/1.2\r\n, and the resolved accessible service server IP address of the terminal device B such as 2.2.2.2 in the preset list, where the accessible service server IP address is referred to as the preset service server IP address, and so on. Thus, the preset list is established, so that the gateway device can judge whether the service server, which is requested by the terminal device A or terminal device B corresponding to the subsequently received terminal domain name, is within the accessible range, according to the preset service server IP address corresponding to the terminal domain name in the list.

It should be noted that, there is no sequence relationship among S201, S202, S203, S204 and S205, as long as S201, S202 and S203 are performed before S206, S207 or S208.

S204, the gateway device receives a service request packet sent by a terminal device, where the packet carries a terminal domain name indicating the terminal device and a server domain name indicating a service server required by the service request sent by the terminal device.

S205, the gateway device resolves the received server domain name to obtain a service server Internet protocol (IP) address.

It should be noted that, after S205, if the resolved service server IP address does not belong to the preset service server IP address corresponding to the received terminal domain name in a preset list, then perform step S206; if the resolved service server IP address belongs to the preset service server IP address corresponding to the received terminal domain name in a preset list, then perform step S207 or S208 according to requirement of the gateway device.

S206, the gateway device discards the packet.

Because the resolved service server IP address does not belong to the preset service server IP address corresponding to the received terminal domain name in a preset list, the gateway device can determine the packet is a malicious and fraudulent packet or an abnormal packet, and discard the packet, where the specific method has been disclosed in the above embodiments, and will not be repeated here.

S207, the gateway device establishes a connection between the terminal device and a service server corresponding to the service server IP address, so that the service server provides a service corresponding to the service request of the terminal device to the terminal device.

It should be noted that, because the resolved service server IP address belongs to the preset service server IP address corresponding to the received terminal domain name in a preset list, that is, the terminal device only needs to normally access the accessible service server, then the gateway device can establish a connection between the terminal device and the service server, so that the service server provides services such as video data or audio data, which is requested by the terminal device, to the terminal device.

S208, the gateway device determines a service type of the service request according to the terminal domain name of the terminal device.

Illustratively, if the gateway device needs to identify the encrypted service type sent by the terminal device or identify the service type of terminal devices having constantly changing IP addresses, the service type may be obtained by comparing the terminal domain name and the preset service server IP address in the preset list. That is, if the service request of the terminal device is encrypted, for example, a certain download tool or a certain mail tool is encrypted, then the gateway device fails to obtain the specific service application type by resolving features such as URL of these encrypted applications, However, the gateway needs to limit all the download tools. At this time, after determining the preset service server IP address in the preset list and the service server IP address of the terminal device are the same, the gateway device automatically match the service type according to terminal domain name of the terminal device in the preset list; if the service type of the terminal device A is an encrypted download tool, and the service type of the terminal device B is an encrypted mail tool, then the gateway device can identify and limit the downloading of the terminal device A. In this way, the case can be avoided that during the resolution, since an anti-recognition software is encountered, the service type cannot be obtained and the encrypted service type cannot be operated.

Furthermore, if the service type of the terminal device B is mail download encrypted, and the service type has no significant feature and specific IP address, that is, the IP address is in dynamic state, then, after determining the preset service server IP address in the preset list and the service server IP address of the terminal device are the same based on the preset list, the gateway device obtains the terminal device B according to the terminal domain name of terminal device B in the preset list and, thus, identifies the specific service type. If the corresponding relation between the domain name and the service type is configured in the gateway device, for example, the service type corresponding to the domain name "www.gmail.com" is configured as email, the gateway device can determine that the service type of the terminal device B is a mail according to the terminal domain name www.gmail.com.

It should be noted that, either step S207 or step S208 may be selected to be performed according to different processing manners required by the gateway device. Specifically, if the gateway device needs to determine that the packet is normal and to establish a connection between the terminal device and the service server, the gateway device performs S207; if the gateway device needs to know the service type, the gateway device performs S208.

In the packet receiving method according to embodiments of the present invention, the gateway device receives a service request packet sent by a terminal device, where the packet carries a terminal domain name indicating the terminal device and a server domain name indicating a service server required by the service request, resolves the received server domain name to obtain a service server Internet protocol (IP) address, and discards the packet if the service server IP address does not belong to the preset service server IP address in a preset list corresponding to the terminal domain name. In this way, the gateway device can determine whether the packet is normal or abnormal by comparing the service server IP address of the packet with the preset service server IP address in a preset list corresponding to the terminal domain name of the terminal device to determine whether the service server IP address of the packet is consistent with the preset service server IP address, and discard the abnormal packet, thereby improving the capability for identifying the packet of the gateway device, and preventing the bugs from occurring when the gateway device normally processes the abnormal packet due to insufficient identification.

Figure 4:
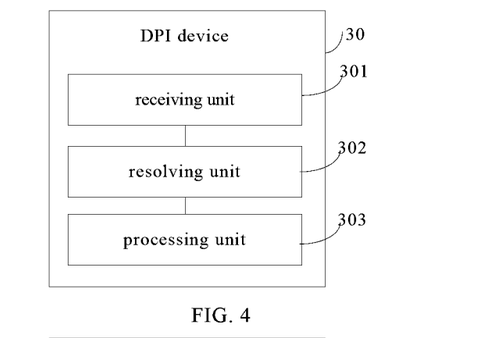
FIG. 4 is a schematic structural diagram of a DPI device according to an embodiment of the present invention.

Embodiments of the present invention provide a DPI device 30, as shown in FIG. 4, including:

a receiving unit 301, configured to receive a service request packet sent by a terminal device 40, where the packet carries a terminal domain name indicating the terminal device 40 and a server domain name indicating a service server required by the service request sent by the terminal device 40.

It should be noted that, the DPI device 30 can establish a connection between the terminal device 40 and the service server required by the terminal device 40 according to the terminal domain name and server domain name received by the receiving unit 301, such that the terminal device 40 can obtain the service required by the service request, which will not be described in detail here.

a resolving unit 302, configured to resolve the server domain name received by the receiving unit 301 to obtain a service server Internet protocol (IP) address.

It should be noted that, the resolving unit 302 can achieve a mutual conversion between a domain name which is readily memorized by a user and a machine recognizable IP address.

a processing unit 303, configured to discard the packet, if the service server IP address resolved by the resolving unit 302 does not belong to the preset service server IP address in a preset list corresponding to the terminal domain name received by the receiving unit 301.

It should be noted that, if the terminal domain name received by the receiving unit 301 in the preset list is not correspond to the service server which is accessible and should be corresponded to the terminal domain name, i.e., the preset service server recorded in the preset list, it proves that the accessed packet is abnormal, such as a malicious and fraudulent packet and a packet for accessing a charged website for free, the processing unit 303 discards the packet.

the processing unit 303 is further configured to establish a connection between the terminal device 40 and the service server corresponding to the service server IP address if the service server IP address resolved by the resolving unit 302 belongs to the preset service server IP address corresponding to the terminal domain name in the preset list, which is received by the receiving unit 301, so that the service server provides the service corresponding to the service request of the terminal device 40 to the terminal device 40. Alternatively, if the service server IP address resolved by the resolving unit 302 belongs to the preset service server IP address corresponding to the terminal domain name in the preset list, which is received by the receiving unit 301, the processing unit 303 determines the service type of the service request according to the terminal domain name of the terminal device 40.

Figure 5:
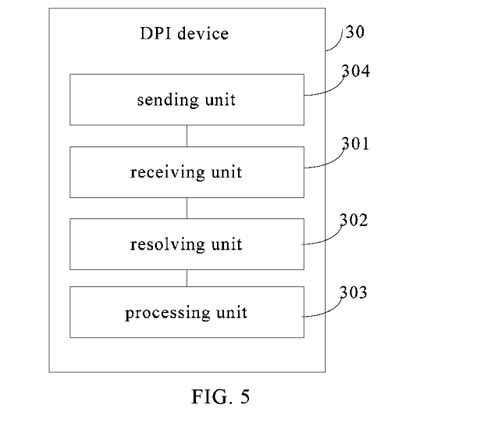
FIG. 5 is a schematic structural diagram of a DPI device according to another embodiment of the present invention.

Further, the DPI device 30, as shown in FIG. 5, also includes:

a sending unit, configured to send a DNS query request to the terminal device 40, so that the terminal device 40 sends the DNS packet.

Where, the receiving unit 301 is further configured to receive the DNS packet sent by the terminal device 40, the DNS packet carries the terminal domain name and a true domain name of at least one accessible service server corresponding to the terminal domain name.

the resolving unit 302 is further configured to resolve the true domain name received by the receiving unit 301 to obtain at least one accessible service server IP address.

At this time, the processing unit 303 sets, corresponding relation between the terminal domain name received by the receiving unit 301, and the at least one accessible service server IP address resolved by the resolving unit 302 in the preset list, where the at least one accessible service server IP address is taken as the preset service server IP address, so that the subsequent receiving unit 301 performs comparing in the preset list according to the terminal domain name after receiving the service request packet, so as to avoid performing normal process to the packet when the service server IP address to be accessed by the packet does not correspond to the preset service server IP address corresponding to the terminal domain name in the preset list.

The above DPI device 30 corresponds to the above method embodiments, and the DPI device 30 can be applied in steps of the above method embodiments, where the specific application in each step may refer to the above method embodiments and will not be described in detail here.

Embodiments of the present invention provide a DPI device 30. The DPI device 30 receives a service request packet sent by a terminal device 40, where the packet carries a terminal domain name indicating the terminal device 40 and a server domain name indicating a service server required by the service request, resolves the received server domain name to obtain a service server Internet protocol (IP) address, and discards the packet if the service server IP address does not belong to the preset service server IP address corresponding to the terminal domain name in a preset list. In this way, the DPI device 30 can determine whether the packet is normal or abnormal by comparing the service server IP address of the packet with the preset service server IP address corresponding to the terminal domain name of the terminal device 40 in a preset list to determine whether the service server IP address of the packet is consistent with the preset service server IP address, and discard the abnormal packet, thereby improving the capability for identifying the packet of the DPI device 30, and preventing the bugs from occurring when the DPI device normally processes the abnormal packet due to insufficient identification.

Figure 6:
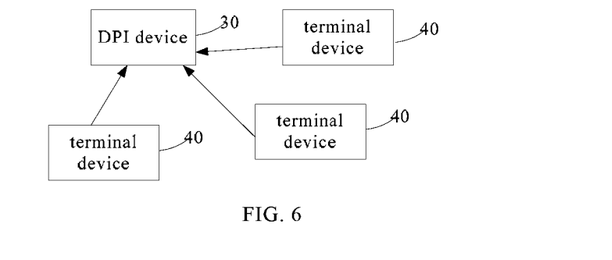
FIG. 6 is a schematic structural diagram of a system according to an embodiment of the present invention.

Embodiments of the present invention provide a system, as shown in FIG. 6, including:

a DPI device 30, configured to receive a service request packet sent by a terminal device 40, and the packet carries a terminal domain name indicating the terminal device 40 and a server domain name indicating the service request; resolve the received service server domain name to obtain a service server Internet protocol (IP) address; and discard the packet if the service server IP address does not belong to the preset service server IP address corresponding to the terminal domain name in a preset list.

a terminal device 40, configured to send the service request packet to the DPI device 30.

The above DPI device 30 and terminal device 40 correspond to the above method embodiments, and the DPI device 30 and the terminal device 40 can be applied in steps of the above method embodiment, where the specific application in each step may refer to the above method embodiment. The specific structure of the DPI device 30 and the structure of the terminal and the DPI device provided by the above embodiments are the same, which will not be described in detail here.

In the system according to embodiments of the present invention, the DPI device 30 receives a service request packet sent by a terminal device 40, where the packet carries a terminal domain name indicating the terminal device 40 and a server domain name indicating a service server required by the service request, resolves the received server domain name to obtain a service server Internet protocol (IP) address, and discards the packet if the service server IP address does not belong to the preset service server IP address corresponding to the terminal domain name in a preset list. In this way, the DPI device 30 can determine whether the packet is normal or abnormal by comparing the service server IP address of the packet with the preset service server IP address corresponding to the terminal domain name of the terminal device 40 in a preset list to determine whether the service server IP address of the packet is consistent with the preset service server IP address, and discard the abnormal packet, thereby improving the capability for identifying the packet of the DPI device 30, and preventing the bugs from occurring when the DPI device normally processes the abnormal packet due to insufficient identification.

The above description are merely some specific embodiments of the present invention, but not intended to limit the protection scope of the present invention. Any modifications, variations or replacement that can be easily derived by persons skilled in the art within the technical scope of the present invention shall fall within the protection scope of the present invention. Therefore, the protection scope of the present invention is subject to the appended claims.

What is claimed is:

1. A packet receiving method, comprising:
    receiving a service request packet sent by a terminal device, wherein the service request packet carries a terminal domain name indicating the terminal device and a server domain name indicating a service server required by the service request packet sent by the terminal device;
    resolving the received server domain name to obtain a service server Internet protocol (IP) address; and
    discarding the service request packet if the resolved service server IP address does not belong to a preset service server IP address corresponding to the received terminal domain name in a preset list, wherein in the preset list the terminal domain name of each terminal device is correspondingly provided with a plurality of accessible service server IP addresses under an access authority of the terminal device.

2. The method according to claim 1, wherein, before the discarding the service request packet if the resolved service server IP address does not belong to the preset service server IP address corresponding to the received terminal domain name in a preset list, the method further comprises:
    receiving a domain name system (DNS) packet sent by the terminal device, wherein the DNS packet carries the terminal domain name and a true domain name of at least one accessible service server corresponding to the terminal domain name, wherein the true domain name of at least one accessible service server is a domain name of the at least one accessible service server, which is not altered by the terminal device;
    resolving the received true domain name to obtain at least one accessible service server IP address; and taking the resolved at least one accessible service server IP address as the preset service server IP address, and setting a corresponding relation between the terminal domain name and the preset service server IP address in the preset list.

3. The method according to claim 2, wherein, before the receiving the DNS packet sent by the terminal device, the method further comprises:
sending a DNS query request to the terminal device, to enable the terminal device to send the DNS packet.

4. The method according to claim 1, wherein, after the resolving the received server domain name to obtain the service server Internet protocol (IP) address, the method further comprises:
if the resolved service server IP address belongs to the preset service server IP address corresponding to the received terminal domain name in the preset list, establishing a connection between the terminal device and the service server corresponding to the service server IP address, to enable the service server to provide a service corresponding to the service request of the terminal device to the terminal device.

5. The method according to claim 1, wherein, after the resolving the received server domain name to obtain the service server Internet protocol (IP) address, the method further comprises:
if the resolved service server IP address belongs to the preset service server IP address corresponding to the received terminal domain name in the preset list, determining a service type of the service request according to the terminal domain name of the terminal device.

6. A deep packet inspection (DPI) device comprising a hardware processor and a non-transitory computer readable storage medium including executable instructions that, when executed by the processor perform a method comprising:
receiving a service request packet sent by a terminal device, wherein the service request packet carries a terminal domain name indicating the terminal device and a server domain name indicating a service server required by the service request packet sent by the terminal device;
resolving the server domain name to obtain a service server Internet protocol (IP) address; and
discarding the packet if the service server IP address resolved does not belong to a preset service server IP address corresponding to the received terminal domain name in a preset list, wherein in the preset list the terminal domain name of each terminal device is correspondingly provided with accessible service server IP addresses under an access authority of the terminal device.

7. The DPI device according to claim 6, wherein, before the discarding the service request packet if the resolved service server IP address does not belong to the preset service server IP address corresponding to the received terminal domain name in a preset list, the method further comprises:
receiving a domain name system (DNS) packet sent by the terminal device, wherein the DNS packet carries the terminal domain name and a true domain name of at least one accessible service server corresponding to the terminal domain name, wherein the true domain name of at least one accessible service server is a domain name of the at least one accessible service server, which has not been altered by the terminal device;
resolving the true domain name received to obtain at least one accessible service server IP address; and
taking the at least one accessible service server IP address resolved by the resolving unit as the preset service server IP address, and setting a corresponding relation between the terminal domain name and the preset service server IP address in the preset list.

8. The DPI device according to claim 7, the method further comprising:
sending a DNS query request to the terminal device, to enable the terminal device to send the DNS packet.

9. The DPI device according to claim 6, wherein after the resolving the received server domain name to obtain the service server Internet protocol (IP) address, the method further comprises:
if the service server IP address resolved belongs to the preset service server IP address corresponding to the received terminal domain name in the preset list, establishing a connection between the terminal device and the service server corresponding to the service server IP address, to enable the service server to provide a service corresponding to the service request of the terminal device to the terminal device.

10. The DPI device according to claim 6, wherein after the resolving the received server domain name to obtain the service server Internet protocol (IP) address, the method further comprises:
if the service server IP address resolved belongs to the preset service server IP address corresponding to the received terminal domain name in the preset list, determining a service type of the service request according to the terminal domain name of the terminal device.

11. A system, comprising:
a deep packet inspection (DPI) device; and
a terminal device, configured to send a service request packet to the DPI device, wherein the packet carries a terminal domain name indicating the terminal device and a server domain name indicating a service server required by the service request sent by the terminal device;
the DPI device having a hardware processor and a non-transitory computer readable storage medium including executable instructions that, when executed by the processor perform a method comprising:
receiving the service request packet sent by the terminal device;
resolving the server domain name received to obtain a service server Internet protocol (IP) address; and
discarding the packet if the service server IP address resolved does not belong to a preset service server IP address corresponding to the received terminal domain name in a preset list, wherein in the preset list the terminal domain name of each terminal device is correspondingly provided with accessible service server IP addresses under an access authority of the terminal device.

* * * * *

(12) EX PARTE REEXAMINATION CERTIFICATE (12219th)
United States Patent
Guo et al.

(10) Number: US 9,578,040 C1
(45) Certificate Issued: Feb. 6, 2023

(54) PACKET RECEIVING METHOD, DEEP PACKET INSPECTION DEVICE AND SYSTEM

(71) Applicant: Huawei Technologies Co., Ltd., Shenzhen (CN)

(72) Inventors: Jiancheng Guo, Shenzhen (CN); Zhenggang You, Shenzhen (CN)

(73) Assignee: ORBIT LICENSING LLC, Frisco, TX (US)

Reexamination Request:
No. 90/014,897, Nov. 9, 2021

Reexamination Certificate for:
Patent No.: 9,578,040
Issued: Feb. 21, 2017
Appl. No.: 14/572,514
Filed: Dec. 16, 2014

Related U.S. Application Data (63) Continuation of application No. PCT/CN2012/077994, filed on Jun. 30, 2012.

(51) Int. Cl.
*H04L 9/40* (2022.01)
*H04L 43/10* (2022.01)
*H04L 47/2441* (2022.01)

(52) U.S. Cl.
CPC ............ *H04L 63/123* (2013.01); *H04L 43/10* (2013.01); *H04L 47/2441* (2013.01); *H04L 63/0236* (2013.01); *H04L 63/0245* (2013.01)

(58) Field of Classification Search
None
See application file for complete search history.

(56) References Cited

To view the complete listing of prior art documents cited during the proceeding for Reexamination Control Number 90/014,897, please refer to the USPTO's Patent Electronic System.

*Primary Examiner* — Samuel G Rimell (57) ABSTRACT

Embodiments of the present invention provide a packet receiving method, a deep packet inspection device and system, which relates to the field of communications. The packet receiving method includes: receiving a service request packet sent by a terminal device, where the packet carries a terminal domain name indicating the terminal device and a server domain name indicating a service server required by the service request; resolving the received server domain name to obtain a service server Internet protocol (IP) address; and discarding the packet if the resolved service server IP address does not belong to the present service server IP address corresponding to the received terminal domain name in a preset list. Embodiments of the present invention are applied to the processing of the packet.

a DPI device receives a service request packet sent by a terminal device, where the packet carries a terminal domain name indicating the terminal device and a server domain name indicating a service server required by the service request sent by the terminal device — S101 the DPI device resolves the received server domain name to obtain a service server IP address — S102 if the service server IP address resolved by the DPI device does not belong to the preset service server IP address corresponding to the received terminal domain name in a preset list, the DPI device discards the packet — S103

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1, 4-6 and 9-11 are cancelled.

Claims 2-3 and 7-8 were not reexamined.

\* \* \* \* \*